United States Patent [19]

Koyama et al.

[11] Patent Number: 5,248,725

[45] Date of Patent: Sep. 28, 1993

[54] THERMOPLASTIC RESIN COMPOSITION

[75] Inventors: Teruhisa Koyama; Shinji Date, both of Niihama, Japan

[73] Assignee: Sumitomo Chemical Company, Limited, Osaka, Japan

[21] Appl. No.: 713,843

[22] Filed: Jun. 12, 1991

[30] Foreign Application Priority Data

Jun. 29, 1990 [JP] Japan .................. 2-173132

[51] Int. Cl.$^5$ .................. C08L 51/04; C08L 55/02; C08L 33/24; C08L 67/02
[52] U.S. Cl. .................. 525/64; 525/68
[58] Field of Search .................. 525/64, 68

[56] References Cited

U.S. PATENT DOCUMENTS 4,246,374  1/1981  Kopchik .

FOREIGN PATENT DOCUMENTS

| | | | |
|---|---|---|---|
| 0314188 | 5/1989 | European Pat. Off. | 525/64 |
| 0354034 | 8/1989 | European Pat. Off. | |
| 59-41355 | 3/1984 | Japan . | |
| 60-202139 | 10/1985 | Japan . | |
| 62-285947 | 12/1987 | Japan | 525/64 |
| 2-127455 | 5/1990 | Japan . | |
| 2-158614 | 6/1990 | Japan . | |
| 9108261 | 6/1991 | Japan . | |

*Primary Examiner*—Patricia A. Short
*Attorney, Agent, or Firm*—Birch, Stewart, Kolasch & Birch

[57] ABSTRACT

A thermoplastic resin composition comprising (A) 5 to 75% by weight of a glutarimide copolymer which comprises 5 to 99.5% by mol of repeating units derived from glutarimide, 0.5 to 10% by mol of repeating units derived from an acid and/or acid anhydride and 0 to 94.5% by mol of repeating units derived from an $\alpha,\beta$-ethylenically unsaturated monomer,
(B) 10 to 80% by weight of a saturated polyester,
(C) 10 to 80% by weight of a rubber-containing copolymer obtainable by polymerizing, in the presence of (1) 10 to 80% by weight of a rubbery polymer, (2) 20 to 90% by weight of at least one $\alpha,\beta$-ethylenically unsaturated monomer selected from the group consisting of an aromatic $\alpha,\beta$-ethylenically unsaturated monomer, a cyano group-containing $\alpha,\beta$-ethylenically unsaturated monomer and an $\alpha,\beta$-ethylenically unsaturated carboxylic acid ester monomer, and
(D) 0.1 to 20% by weight of an epoxy group-containing copolymer, which composition has an excellent combination of good heat resistance, good impact resistance, high stiffness, good oil resistance and good solvent resistance.

15 Claims, No Drawings

THERMOPLASTIC RESIN COMPOSITION

BACKGROUND OF THE INVENTION

1. Field of the Invention

The present invention relates to a thermoplastic resin composition comprising four types of thermoplastic resins and having various excellent properties.

2. Description of the Related Art

Thermoplastic resins are used in various fields by utilizing respective properties of each resin. Materials having a higher performance have been recently discovered and proposed by mixing two or more resins of different types.

U.S. Pat. No. 4,246,374 (corresponding to GB 1,559,132) describes a method for producing a glutarimide polymer and a blend of this polymer with an ABS resin or MBS resin which is an impact resistance-improving agent. Japanese Patent Kokai Publication No. 41355/1984 describes a thermoplastic resin composition comprising a thermoplastic polyester, polyglutarimide and an impact modifier.

With respect to the blend of the glutarimide polymer and the impact resistance-improving agent described in U.S. Pat. No. 4,246,374, a content of the impact resistance-improving agent is increased and heat resistance which the glutarimide polymer possesses as its distinctive feature becomes poor when the still higher impact resistance is required. The resin composition described in Japanese Patent Kokai Publication No. 41355/1984 also has poor heat resistance and impact resistance.

SUMMARY OF THE INVENTION

An object of the present invention is to provide a resin composition having a combination of good heat resistance, high stiffness, good impact resistance, good solvent resistance and good oil resistance with good balance.

This and other objects of the present invention are achieved by a thermoplastic resin composition comprising (A) 5 to 75% by weight of a glutarimide copolymer which comprises 5 to 99.5% by mol of repeating units derived from glutarimide, 0.5 to 10% by mol of repeating units derived from an acid and/or acid anhydride and 0 to 94.5% by mol of repeating units derived from an $\alpha,\beta$-ethylenically unsaturated monomer, (B) 10 to 80% by weight of a saturated polyester, (C) 10 to 80% by weight of a rubber-containing copolymer obtainable by polymerizing, in the presence of (1) 10 to 80% by weight of a rubbery polymer, (2) 20 to 90% by weight of at least one $\alpha,\beta$-ethylenically unsaturated monomer selected from the group consisting of an aromatic $\alpha,\beta$-ethylenically unsaturated monomer, a cyano group-containing $\alpha,\beta$-ethylenically unsaturated monomer and an $\alpha,\beta$-ethylenically unsaturated carboxylic acid ester monomer, and (D) 0.1 to 20% by weight of an epoxy group-containing copolymer.

DETAILED DESCRIPTION OF THE INVENTION

The glutarimide unit of the glutarimide copolymer (A) used in the present invention is preferably expressed by the general formula:

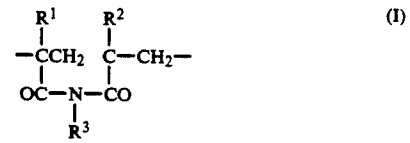

wherein $R^1$ and $R^2$ are the same or different and each a hydrogen atom or a methyl group, and $R^3$ is a hydrogen atom or an aliphatic, aromatic or alicyclic hydrocarbon group having 1 to 20 carbon atoms. Among them, a unit (I) wherein the $R^3$ group is the hydrogen atom or the methyl group imparts excellent heat resistance, and a unit (I) wherein the $R^3$ group is a cyclohexyl group provides an excellent composition having a low moisture absorptivity. The glutarimide copolymer (A) contains the glutarimide unit in an amount of 5 to 99.5% by mol, preferably 20 to 99% by mol based on the copolymer (A). If the amount of the glutarimide unit is smaller than 5% by mol, the resin composition has poor heat resistance.

The acid and/or acid anhydride unit is derived from, for example, (meth)acrylic acid, a six-membered ring acid and anhydrides thereof. This unit increases the impact resistance of the composition. The glutarimide copolymer (A) contains the acid and/or anhydride unit in an amount of 0.5 to 10% by mol, preferably 1 to 5% by mol base on the copolymer (A). If the amount of the acid and/or anhydride unit is larger than 10% by mol, a moisture absorptivity of the composition is undesirably high.

Specific examples of the monomer which forms the $\alpha,\beta$-ethylenically unsaturated monomer unit of the glutarimide copolymer (A) are (meth)acrylic acid esters, (meth)acrylic acid, styrene, $\alpha$-methylstyrene, vinyltoluene, chlorostyrene and acrylonitrile. Specific examples of the (meth)acrylic acid esters are methyl (meth)acrylate, ethyl (meth)acrylate, propyl (meth)acrylate, n-butyl (meth)acrylate, isobutyl (meth)acrylate, tert.-butyl (meth)acrylate, dodecyl (meth)acrylate, cyclohexyl (meth)acrylate, norbornyl (meth)acrylate, 2-ethylhexyl (meth)acrylate and benzyl (meth)acrylate. The glutarimide copolymer (A) contains this monomer unit in an amount of 0 to 94.5% by mol, preferably 0.1 to 75% by mol based on the copolymer (A).

These units may be used independently or in combination.

A weight average molecular weight of the glutarimide copolymer (A) is usually 40,000 to 500,000, preferably 40,000 to 200,000. If the molecular weight is smaller than 40,000, the mechanical strength is deteriorated and if it is larger than 500,000, the molding workability is poor.

The glutarimide copolymer (A) can be prepared by a conventional method such as a method described in U.S. Pat. No. 4,246,374.

For example, the glutarimide copolymer (A) can be prepared by melting a homopolymer or copolymer comprising, as an essential component, (meth)acrylic acid or a (meth)acrylic acid ester and then reacting the melt with an imidating agent. Specific examples of the imidating agent are ammonia, methylamine, ethylamine, butylamine, hexylamine, octylamine, nonylamine, decylamine, benzylamine, cyclohexylamine, aniline, halogenated aniline, urea and dimethylurea.

The composition of the present invention contains the glutarimide copolymer (A) in an amount of 5 to 75% by weight, preferably 10 to 60% by weight based on the composition. If the amount of the glutarimide copolymer (A) is smaller than 5% by weight, the composition has only very low heat resistance. If it is larger than 75% by weight, the composition has undesirably poor impact resistance.

The saturated polyester (B) used in the present invention may be a known product prepared from a dicarboxylic acid component and a diol component.

Specific examples of the dicarboxylic acid component are aromatic dicarboxylic acids such as terephthalic acid, isophthalic acid and naphthalene dicarboxylic acid; and aliphatic dicarboxylic acids having 2 to 20 carbon atoms such as adipic acid, sebacic acid and dodecanedicarboxylic acid. Preferable dicarboxylic acid component is terephthalic acid and a mixture of terephthalic acid with other dicarboxylic acid. The mixture contains terephthalic acid in an amount of at least 40% by mol.

Specific examples of the diol component are aliphatic glycols such as ethylene glycol, propylene glycol, butylene glycol, hexylene glycol and decanediol; alicyclic diols such as cyclohexanediol; and aromatic diols such as bisphenol A. The diol may be used alone or as a combination of at least two diols.

Among the saturated polyesters (B), polybutylene terephthalate and polyethylene terephthalate are generally preferable.

In view of a mechanical strength of the composition, the saturated polyester (B) preferably has an inherent viscosity in the range of 0.5 to 3.0 dl/g when measured at 25° C. in an o-chlorophenol solvent.

The composition of the present invention contains the saturated polyester (B) in an amount of 10 to 80% by weight, preferably 15 to 70% by weight based on the composition. If the amount of the saturated polyester (B) is smaller than 10% by weight, the composition has poor solvent resistance. If it is larger than 80% by weight, the composition has poor heat resistance and poor impact resistance.

The rubber-containing copolymer (C) used in the present invention is a polymer obtainable by polymerizing an $\alpha,\beta$-ethylenically unsaturated monomer in the presence of a rubbery polymer. The $\alpha,\beta$-ethylenically unsaturated monomer is at least one selected from the group consisting of aromatic $\alpha,\beta$-ethylenically unsaturated monomers such as styrene and $\alpha$-methylstyrene; cyano group-containing $\alpha,\beta$-ethylenically unsaturated monomers such as acrylonitrile and methacrylonitrile; and $\alpha,\beta$-ethylenically unsaturated carboxylic acid ester monomers such as methyl (meth)acrylate and ethyl (meth)acrylate. Maleimide, maleic anhydride and (meth)acrylic acid may be used in addition to the $\alpha,\beta$-ethylenically unsaturated monomer. The rubbery polymer may be a polybutadiene rubber, an acrylonitrile-butadiene rubber, a styrene-butadiene rubber, an acrylic rubber and an ethylenepropylene-diene rubber. A conventional polymerizing method such as an emulsion polymerization, a bulk polymerization and a bulk-suspension polymerization can be used.

Specific examples of the rubber-containing copolymer (C) are an ABS resin, an MBS resin and an AES resin.

The rubber-containing copolymer (C) contains the rubbery polymer in an amount of 10 to 80% by weight, preferably 30 to 70% by weight based on the copolymer (C). If the amount of the rubbery polymer is smaller than 10% by weight, the composition has poor impact resistance. If it is larger than 80% by weight, the composition has low stiffness and poor heat resistance.

The composition of the present invention contains the rubber-containing copolymer (C) in an amount of 10 to 80% by weight, preferably 15 to 70% by weight based on the composition. If the amount of the copolymer (C) is smaller than 10% by weight, the composition has poor impact resistance. If it is larger than 80% by weight, the composition has poor heat resistance, low stiffness and poor solvent resistance.

The epoxy group-containing copolymer (D) used in the present invention is a copolymer comprising epoxy group-containing $\alpha,\beta$-ethylenically unsaturated monomer units and other $\alpha,\beta$-ethylenically unsaturated monomer units.

A composition of the epoxy group-containing copolymer (D) is not especially limited. Usually, the epoxy group-containing copolymer (D) contains the epoxy group-containing $\alpha,\beta$-ethylenically unsaturated monomer units in an amount of 0.1 to 50% by weight, preferably 1 to 30% by weight based on the copolymer (D). The epoxy group-containing $\alpha,\beta$-ethylenically unsaturated monomer may be, for example, unsaturated glycidyl esters of the formula:

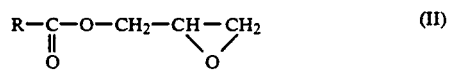

wherein R is a hydrocarbon group having an $\alpha,\beta$-ethylenically unsaturated bond and 2 to 18 carbon atoms, and unsaturated glycidyl ethers of the formula:

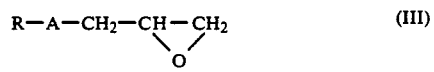

wherein R is the same as defined above, and A is an alkylene oxide group having 1 to 6 carbon atoms or a phenylene oxide group. Specific examples of the epoxy group-containing $\alpha,\beta$-ethylenically unsaturated monomer are glycidyl (meth)acrylate, itaconic acid glycidyl ester, allylglycidyl ether, 2-methylallylglycidyl ether and styrene-p-glycidyl ether.

The other $\alpha,\beta$-ethylenically unsaturated monomer may be, for example, olefins, vinyl esters of aliphatic carboxylic acids having 2 to 6 carbon atoms, (meth)acrylic acid esters, maleic acid esters, fumaric acid esters, vinyl halides, styrenes, nitriles, vinyl ethers and acrylamides.

Specific examples of the other $\alpha,\beta$-ethylenically unsaturated monomer are ethylene, propylene, butene-1, vinyl acetate, methyl (meth)acrylate, ethyl (meth)acrylate, dimethyl maleate, diethyl fumarate, vinyl chloride, vinylidene chloride, styrene, acrylonitrile, isobutyl vinyl ether and acrylamide. In order to improve the impact resistance at a low temperature by lowering a glass transition point, it is suitable to combine two or more components such as ethylene-vinyl acetate and ethylene-methyl acrylate.

Typical example of the epoxy group-containing copolymer (D) is an ethylene-glycidyl methacrylate copolymer.

A molecular weight of the epoxy group-containing copolymer (D) may be 10,000 to 1,000,000, preferably 20,000 to 800,000.

The epoxy group-containing copolymer (D) can be prepared by any of various conventional methods such as a method for preparing a random copolymer by conducting a bulk polymerization or a radical polymerization in an inert organic solvent of the epoxy group-containing α,β-ethylenically unsaturated monomer and the other α,β-ethylenically unsaturated monomer; and a method for preparing a graft copolymer by impregnating the epoxy group-containing α,β-ethylenically unsaturated monomer into a polymer of the other α,β-ethylenically unsaturated monomer and then conducting a radical polymerization.

Concretely, the epoxy group-containing copolymer (D) can be prepared by a method for copolymerizing ethylene and the epoxy group-containing α,β-ethylenically unsaturated monomer in the presence of a radical-generating agent at a pressure of 500 to 4,000 atmospheres and a temperature of 100° to 300° C. according the process for the production of high pressure polyethylene; and a method comprising melting polypropylene in an extruder, kneading it with the epoxy group-containing α,β-ethylenically unsaturated monomer and a radical-generating agent and then conducting a graft polymerization.

The composition contains the epoxy group-containing copolymer (D) in an amount of 0.1 to 20% by weight, preferably 0.5 to 10% by weight based on the composition. If the amount of the epoxy group-containing copolymer (D) is smaller than 0.1% by weight, the composition has poor impact resistance, poor oil resistance and poor solvent resistance. If it is larger than 20% by weight, the composition has poor heat resistance, low stiffness and a low molding workability.

For compounding the polymers (A), (B), (C) and (D) to prepare the composition, any of conventional methods can be used. The conventional methods include a method comprising mixing the polymer solutions and then distilling the solvent or introducing the solutions in a nonsolvent to precipitate the composition; a method comprising melting and kneading the polymers in a single-screw or twin-screw extruder or various kinds of kneaders; and a method comprising directly kneading the polymers during the melt processing operation such as in an extrusion molding or injection molding.

The thermoplastic resin composition of the present invention may contain conventional antioxidants such as a hindered phenol antioxidant, a phosphorus antioxidant and a sulfur antioxidant, weather-resisting agents such as an ultraviolet light absorber and a hindered amine photostabilizer, lubricants, antistatic agents, flame retardants, colorants and pigments. In addition, the composition of the present invention may contain reinforcing fibers such as a glass fiber and inorganic fillers according to the applications.

The thermoplastic resin composition of the present invention has an excellent combination of good heat resistance as typified by a heat distortion temperature, good impact resistance, high stiffness as typified by a flexural modulus, good oil resistance and good solvent resistance. By elaborating their properties, the resin composition of the present invention can be used for various applications such as parts for an electrical apparatus, automobile parts such as interior fittings and exterior panels and sundries.

PREFERRED EMBODIMENTS OF THE INVENTION

The present invention is illustrated by the following Examples.

Methods for measurement used in Examples were as follows:

A heat distortion temperature was measured under a load of 18.6 kg/cm$^2$ in accordance with ASTM D 648.

Notched Izod impact strength was measured in accordance with ASTM D 256.

A flexural modulus was measured in accordance with ASTM D 790.

EXAMPLES 1 TO 7 AND COMPARATIVE EXAMPLES 1 AND 2

After compounding the amounts indicated in the following Table of a glutarimide copolymer (KAMAX® T-150 manufactured by Rohm & Haas Co., content of glutarimide units: 75 mol %, acid value: 5 mol %), polybutylene terephthalate as a saturated polyester (TOUGHPET® PBT N-1000 manufactured by Mitsubishi Rayon Co. Ltd., inherent viscosity: 1.13), an ABS resin as a rubber-containing copolymer (KURARASTIK® MV manufactured by Sumitomo Naugatucks Co. Ltd., melt flow index under 10 kg at 220° C. for 10 min.: 9) and an epoxy group-containing copolymer (melt flow index under 2.16 kg at 190° C. for 10 min.: 7) prepared from 83% by weight of ethylene, 5% by weight of vinyl acetate and 12% by weight of glycidyl methacrylate according to the method described in Japanese Patent Kokai Publication No. 23490/1972, pellets of the resin composition were obtained by extruding the composition at a resin temperature of 250° C. in a twin-screw extruder. Test pieces were prepared by molding the pellets by means of an injection molding machine at a cylinder temperature of 260° C. and a mold temperature of 60° C. The properties of the test pieces were evaluated. The results are shown in the following Table.

COMPARATIVE EXAMPLE 3

The same procedure as in Example 1 was repeated except that KAMAX® T-240 (content of glutarimide units: 75 mol %, acid value: 0 mol %) was used as the glutarimide copolymer. The properties were evaluated. The results are shown in the following Table.

TABLE

| Example No. | Glutarimide copolymer (wt %) | Saturated polyester (wt %) | Rubber-containing copolymer (wt %) | Epoxy group-containing copolymer (wt %) | Heat distortion temperature (°C.) | Izod impact strength (kgf · cm/cm) | Flexural modulus (kgf/cm$^2$) |
| --- | --- | --- | --- | --- | --- | --- | --- |
| 1 | 10 | 45 | 42 | 3 | 73 | 10 | 20300 |
| 2 | 20 | 25 | 52 | 3 | 75 | 7 | 20600 |
| 3 | 20 | 40 | 39 | 1 | 74 | 5 | 23000 |
| 4 | 20 | 40 | 37 | 3 | 74 | 6 | 22100 |
| 5 | 20 | 40 | 35 | 5 | 75 | 5 | 21300 |
| 6 | 20 | 55 | 22 | 3 | 78 | 5 | 24100 |
| 7 | 30 | 35 | 32 | 3 | 78 | 4 | 24000 |
| Com.1 | 10 | 45 | 45 | 0 | 75 | 5 | 21700 |
| Com.2 | 20 | 77 | 0 | 3 | 61 | 3 | 26800 |

TABLE-continued

| Example No. | Glutarimide copolymer (wt %) | Saturated polyester (wt %) | Rubber-containing copolymer (wt %) | Epoxy group-containing copolymer (wt %) | Heat distortion temperature (°C.) | Izod impact strength (kgf · cm/cm) | Flexural modulus (kgf/cm²) |
| --- | --- | --- | --- | --- | --- | --- | --- |
| Com.3 | 10 | 45 | 42 | 3 | 81 | 4 | 20800 |

What is claimed is:

1. A thermoplastic resin composition comprising:
   (A) 5 to 75% by weight of a glutarimide copolymer which comprises 5 to 99.5% by mol of repeating units derived from glutarimide, 0.5 to 10% by mol of repeating units derived from an acid and/or acid anhydride and 0 to 94.5% by mol of repeating units derived from an $\alpha,\beta$-ethylically unsaturated monomer;
   (B) 10 to 80% by weight of a saturated polyester, wherein said saturated polyester is a product prepared from a dicarboxylic acid component and a diol component;
   (C) 10 to 80% by weight of a rubber-containing copolymer obtained by polymerizing, in the presence of (1) 10 to 80% by weight of a rubbery polymer, (2) 20 to 90% by weight of at least one $\alpha,\beta$-ethylenically unsaturated monomer selected from the group consisting of an aromatic $\alpha,\beta$-ethylenically unsaturated monomer, a cyano group-containing $\alpha,\beta$-ethylenically unsaturated monomer and an $\alpha,\beta$-ethylenically unsaturated carboxylic acid ester monomer; and
   (D) 0.1 to 20% by weight of an epoxy group-containing copolymer comprising epoxy group-containing $\alpha,\beta$-ethylenically unsaturated monomer units and other $\alpha,\beta$-ethylenically unsaturated monomer units.

2. The thermoplastic resin composition according to claim 1, wherein the glutarimide unit of the glutarimide copolymer (A) is expressed by the general formula:

$$-CCH_2\underset{\underset{R^3}{|}}{\underset{|}{C}}-CH_2-\quad (I)$$
with $R^1$, $R^2$ substituents and $OC-N-CO$ ring wherein $R^1$ and $R^2$ are the same or different and each a hydrogen atom or a methyl group, and $R^3$ is a hydrogen atom or an aliphatic, aromatic or alicyclic hydrocarbon group having 1 to 20 carbon atoms.

3. The thermoplastic resin composition according to claim 1, wherein the acid and/or acid anhydride in the glutarimide copolymer (A) is at least one selected from the group consisting of (meth)acrylic acid, and six-membered ring acid anhydrides.

4. The thermoplastic resin composition according to claim 1, wherein the $\alpha,\beta$-ethylenically unsaturated monomer in the glutarimide copolymer (A) is at least one selected from the group consisting of (meth)acrylic acid esters, (meth)acrylic acid, styrene, $\alpha$-methylstyrene, vinyltoluene, chlorostyrene and acrylonitrile.

5. The thermoplastic resin composition according to claim 1, wherein a weight average molecular weight of the glutarimide copolymer (A) is 40,000 to 500,000.

6. The thermoplastic resin composition according to claim 1, wherein the saturated polyester (B) has an inherent viscosity in the range of 0.5 to 3.0 dl/g as measured at 25° C. in an o-chlorophenol solvent.

7. The thermoplastic resin composition according to claim 1, wherein the rubbery polymer for preparing the rubber-containing copolymer (C) is at least one selected from the group consisting of a polybutadiene rubber, an acrylonitrile-butadiene rubber, a styrene-butadiene rubber, an acrylic rubber and an ethylene-propylene-diene rubber.

8. The thermoplastic resin composition according to claim 1, wherein the epoxy group-containing copolymer (D) is a copolymer comprising epoxy group-containing $\alpha,\beta$-ethylenically unsaturated monomer units in an amount of 0.1 to 50% by weight and other $\alpha,\beta$-ethylenically unsaturated monomer units in an amount of 50 to 99.9% by weight.

9. The thermoplastic resin composition according to claim 8, wherein the epoxy group-containing $\alpha,\beta$-ethylenically unsaturated monomer is at least one selected from the group consisting of glycidyl (meth)acrylate, itaconic acid glycidyl ester, allylgycidyl ether, 2-methylallylglycidyl ether and styrene-p-glycidyl ether.

10. The thermoplastic resin composition according to claim 1, wherein said composition comprises 10 to 60% by weight of said glutarimide copolymer (A), 15 to 70% by weight of said saturated polyester (B), 15 to 70% by weight of said rubber-containing copolymer (C), and 0.5 to 10% by weight of said epoxy group-containing copolymer (D).

11. The thermoplastic resin composition according to claim 1, wherein said glutarimide copolymer (A) comprises 20 to 99% by mol of repeating units derived from glutarimide, 1 to 5% by mol of repeating units derived from an acid and/or acid anhydride and 0.1 to 75% by mol of repeating units derived from an $\alpha,\beta$-unsaturated monomer.

12. The thermoplastic resin composition according to claim 2, wherein said $R^3$ group is a hydrogen atom or a methyl group.

13. The thermoplastic resin composition according to claim 2, wherein said $R^3$ group is a cyclohexyl group.

14. The thermoplastic resin composition according to claim 1, wherein a weight average molecular weight of the glutarimide copolymer (A) is 40,000 to 200,000.

15. The thermoplastic resin composition according to claim 1, wherein the molecular weight of the epoxy group-containing copolymer (D) is 10,000 to 1,000,000.

* * * * *